US011156224B2

(12) United States Patent
Hoffman et al.

(10) Patent No.: US 11,156,224 B2
(45) Date of Patent: Oct. 26, 2021

(54) BACKPACK BLOWER

(71) Applicant: TTI (MACAO COMMERCIAL OFFSHORE) LIMITED, Macau (MO)

(72) Inventors: Ronald J. Hoffman, Iva, SC (US); Eric Nolin, Anderson, SC (US); Christopher A. Holman, Clemson, SC (US); Lance A. Eckard, Anderson, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 215 days.

(21) Appl. No.: 16/003,924

(22) Filed: Jun. 8, 2018

(65) Prior Publication Data
US 2019/0104694 A1 Apr. 11, 2019

Related U.S. Application Data

(60) Provisional application No. 62/570,584, filed on Oct. 10, 2017.

(51) Int. Cl.
*F04D 17/16* (2006.01)
*F16M 13/04* (2006.01)
(Continued)

(52) U.S. Cl.
CPC ........... *F04D 17/162* (2013.01); *A01G 20/47* (2018.02); *A47L 5/14* (2013.01); *A47L 5/36* (2013.01);
(Continued)

(58) Field of Classification Search
CPC .. A01G 20/47; A47L 5/36; A47L 5/14; E21H 1/0809; F16M 13/04; F05D 2250/181;
(Continued)

(56) References Cited

U.S. PATENT DOCUMENTS 1,602,008 A * 10/1926 Germeyer ............. F04D 17/162
415/97
1,831,272 A * 11/1931 Tyler ..................... F04D 17/162
415/98
(Continued)

FOREIGN PATENT DOCUMENTS

CH 149509 A 9/1931
CN 1748061 A 3/2006
(Continued)

OTHER PUBLICATIONS

European Patent Office Extended Search Report for Application No. 19167941.4 dated Aug. 5, 2019 (8 pages).
(Continued)

*Primary Examiner* — Charles G Freay
(74) *Attorney, Agent, or Firm* — Michael Best & Friedrich LLP

(57) ABSTRACT

A blower including a housing at least partially defining a chamber, a motor including a drive shaft defining a rotational axis, an impeller driven by the motor to generate an air flow in the chamber, and a coupler operably connected between the drive shaft and the impeller. The chamber may have an axial height which increases from a position proximate a back plate to a position spaced from the back plate. The chamber may have a non-circular cross-section proximate a chamber outlet, and a tube assembly in fluid communication with the chamber may have a tube inlet with a non-circular cross-section. The impeller may define two separate airflow paths each having an inlet and an outlet.

7 Claims, 14 Drawing Sheets

(51) Int. Cl.
| | |
|---|---|
| *A01G 20/47* | (2018.01) |
| *F04D 25/08* | (2006.01) |
| *A47L 5/36* | (2006.01) |
| *F04D 29/42* | (2006.01) |
| *A47L 5/14* | (2006.01) |
| *F04D 29/44* | (2006.01) |
| *F04D 29/26* | (2006.01) |
| *E01H 1/08* | (2006.01) |
| *F04D 29/62* | (2006.01) |
| *F04D 29/28* | (2006.01) |
| *F04D 29/40* | (2006.01) |

(52) U.S. Cl.
CPC ............ *E01H 1/0809* (2013.01); *F04D 25/08* (2013.01); *F04D 29/263* (2013.01); *F04D 29/281* (2013.01); *F04D 29/403* (2013.01); *F04D 29/424* (2013.01); *F04D 29/4233* (2013.01); *F04D 29/444* (2013.01); *F04D 29/626* (2013.01); *F16M 13/04* (2013.01); *F05D 2250/181* (2013.01); *F05D 2250/241* (2013.01)

(58) Field of Classification Search
CPC .............. F05D 2250/241; F04D 29/281; F04D 29/263; F04D 29/626; F04D 17/162; F04D 25/08; F04D 29/424; F04D 29/444; F04D 29/002; F04D 29/26; F04D 29/403
See application file for complete search history.

(56) References Cited

U.S. PATENT DOCUMENTS

| | | | |
|---|---|---|---|
| 2,143,335 A * | 1/1939 | Toler ..................... | F04D 17/162 415/98 |
| 3,263,909 A | 8/1966 | Mazepa | |
| 4,530,639 A * | 7/1985 | Mowill ................... | F01D 5/048 415/98 |
| 5,052,073 A | 10/1991 | Iida | |
| 5,267,371 A | 12/1993 | Soler et al. | |
| 5,689,852 A | 11/1997 | Svoboda et al. | |
| 5,813,088 A | 9/1998 | Wagner et al. | |
| 6,210,109 B1 | 4/2001 | Will et al. | |
| 6,647,586 B2 | 11/2003 | Rogers et al. | |
| 6,736,610 B2 * | 5/2004 | Cifarelli ............. | A01M 7/0021 415/102 |
| 6,799,949 B2 | 10/2004 | Chuang | |
| 6,928,693 B1 | 8/2005 | Ericson | |
| D537,583 S | 2/2007 | Crevling, Jr. et al. | |
| D538,491 S | 3/2007 | Pan | |
| D556,395 S | 11/2007 | Martin et al. | |
| D584,461 S | 1/2009 | Sweeney | |
| 7,600,290 B1 | 10/2009 | Peters | |
| 7,685,673 B2 | 3/2010 | Kremsler et al. | |
| 7,703,645 B2 | 4/2010 | Moskun | |
| D615,716 S | 5/2010 | Tinius | |
| 7,721,384 B2 | 5/2010 | Crevling, Jr. et al. | |
| 7,735,188 B2 | 6/2010 | Shaffer | |
| D634,418 S | 3/2011 | Li | |
| 9,167,751 B2 | 10/2015 | Thackery et al. | |
| 9,186,954 B2 * | 11/2015 | Ochiai ............... | B60H 1/00471 |
| 2002/0174511 A1 | 11/2002 | Iida et al. | |
| 2006/0059873 A1 | 3/2006 | Scully et al. | |
| 2007/0044270 A1 | 3/2007 | Crevling et al. | |
| 2007/0131228 A1 | 6/2007 | Croll et al. | |
| 2007/0294855 A1 | 12/2007 | Iida et al. | |
| 2008/0172826 A1 * | 7/2008 | Rappin ............... | A01M 7/0021 15/405 |
| 2009/0044835 A1 * | 2/2009 | Peters ..................... | F04D 25/02 134/25.1 |
| 2011/0056047 A1 | 3/2011 | Schliemann et al. | |
| 2011/0146023 A1 | 6/2011 | Wada et al. | |
| 2011/0289718 A1 | 12/2011 | Basenberg, Jr. et al. | |
| 2012/0207593 A1 * | 8/2012 | Ochiai .................. | F04D 29/424 415/204 |
| 2014/0007370 A1 * | 1/2014 | Thackery ............... | A01G 20/43 15/327.5 |
| 2016/0014973 A1 | 1/2016 | Thackery et al. | |
| 2018/0017084 A1 * | 1/2018 | Boutros-Mikhail ... | F01M 13/02 |

FOREIGN PATENT DOCUMENTS

| | | |
|---|---|---|
| CN | 101228357 A | 7/2008 |
| DE | 102004031159 A1 | 1/2006 |
| EP | 821872 A2 | 2/1998 |
| EP | 1008760 A1 | 6/2000 |
| GB | 2017261 A | 10/1979 |
| RU | 2247871 C1 | 3/2005 |
| WO | 2007025115 | 3/2001 |

OTHER PUBLICATIONS

European Patent Office Extended Search Report for Application No. 19167926.5 dated Aug. 5, 2019 (8 pages).
European Patent Office Search Report for Application No. 18199735.4 dated Feb. 27, 2019, 14 pages.
Chinese Patent Office Action for Application No. 201811167572.3 dated Dec. 11, 2020 (8 pages including statement of relevance).
Chinese Patent Office Action for Application No. 201811167572.3 dated Mar. 2, 2020 (8 pages including statement of relevance).
Extended European Search Report for Application No. 18199735.4 dated Jun. 3, 2019 (12 pages).
Extended European Search Report for Application No. 19167923.2 dated Aug. 5, 2019 (8 pages).
Examination Report No. 1 issued by the Australian Government for Application No. 2018214034 dated Sep. 24, 2019 (5 pages).

* cited by examiner

BACKPACK BLOWER

RELATED APPLICATION

The present application claims priority to U.S. Provisional Patent Application No. 62/570,584, filed Oct. 10, 2017, the entire contents of which is hereby incorporated by reference.

FIELD

The invention relates to a blower and, more particularly, to an impeller, impeller housing, and coupler for a blower.

SUMMARY

Backpack leaf blowers generally produce a constant flow of air through a nozzle, tube, or other implement that may be manipulated by a user. In many instances, the blower is self-contained, including an internal combustion engine or other power source configured to generate the energy required to drive the device. However, internal combustion engines can be heavy, and, therefore, trade-offs are made between providing the maximum blowing capacity while minimizing the weight and bulkiness of the device.

In one independent aspect, a blower may generally include a housing defining a chamber, a motor supported by the housing, and a mixed flow fan assembly supported in the chamber and driven by the motor to generate an air flow, the fan assembly including a pair of mixed flow fans connected as a singular component, the fans being operable to draw air in opposing directions and to direct air radially outwardly.

In another independent aspect, a blower may generally include a housing defining a chamber, a motor supported by the housing and having a drive shaft defining an axis, and an impeller supported in the chamber and driven by the motor to generate an air flow. The housing may define a duct having an axial height and a transverse width, the width being less than the height.

In yet another independent aspect, a blower may generally include a housing defining a chamber, a motor supported by the housing and having a drive shaft defining an axis, an impeller supported in the chamber and driven by the motor to generate an air flow, the impeller having an end defining a plurality of recesses, and a coupling operable to couple the impeller to the motor, the coupling including a hub connected to the drive shaft and extending along the axis and a plurality of ribs extending from the hub, each rib being engageable in a recess to drivingly connect the drive shaft to the impeller, each rib extending in a non-radial direction from the hub.

In some constructions, the coupling is disposed in the chamber. In some constructions, each rib extends tangentially relative to a circle centered on the axis.

In a further independent aspect, a blower may generally include a housing at least partially defining a chamber; a motor including a drive shaft defining a rotational axis; an impeller driven by the motor to generate an air flow in the chamber; and a coupler operably connected between the drive shaft and the impeller to transmit torque therebetween, the coupler being connected to one of the drive shaft and the impeller and including a plurality of ribs configured to engage the other of the drive shaft and the impeller, each rib defining a rib axis transverse to the rotational axis, each rib axis being arranged tangent to a circle centered on the rotational axis.

In another independent aspect, a backpack blower may generally include a frame operable to be supported by a user and including a back plate configured to be positioned proximate a back of the user; a housing supported by the frame and at least partially defining a chamber; a motor supported by the frame; and an impeller driven by the motor about a rotational axis to generate an air flow within the chamber. The chamber may define a channel region having a cross-sectional shape with an axial height and a transverse width, the axial height being greater than the transverse width, the axial height increasing from a first position proximate the back plate to a second position spaced from the back plate.

In yet another independent aspect, a blower may generally include a housing at least partially defining a chamber having a chamber inlet and a chamber outlet, the chamber having a non-circular cross-section proximate the chamber outlet; a tube assembly in fluid communication with the chamber, the tube assembly having a tube inlet coupled to the chamber outlet and a tube outlet, the tube assembly having a non-circular cross-section proximate the tube inlet; and an impeller operable to generate an air flow within the chamber and through the tube assembly.

In a further independent aspect, a blower may generally include a housing at least partially defining a chamber; and an impeller driven about a rotational axis to generate an air flow within the chamber, the impeller having a first axial end, an opposite, second axial end, and a periphery, the impeller defining a first airflow path having a first axial inlet proximate the first axial end and open in a first axial direction and a first radial outlet extending about the periphery and open in a substantially radial direction, the impeller defining a second airflow path separate from the first airflow path, the second airflow path having a second axial inlet proximate a second axial end and open in an opposite, second axial direction and a second radial outlet extending along the periphery of the impeller in a substantially radial direction.

Other independent aspects of the invention will become apparent by consideration of the detailed description, claims and accompanying drawings.

DETAILED DESCRIPTION

Figure 1:
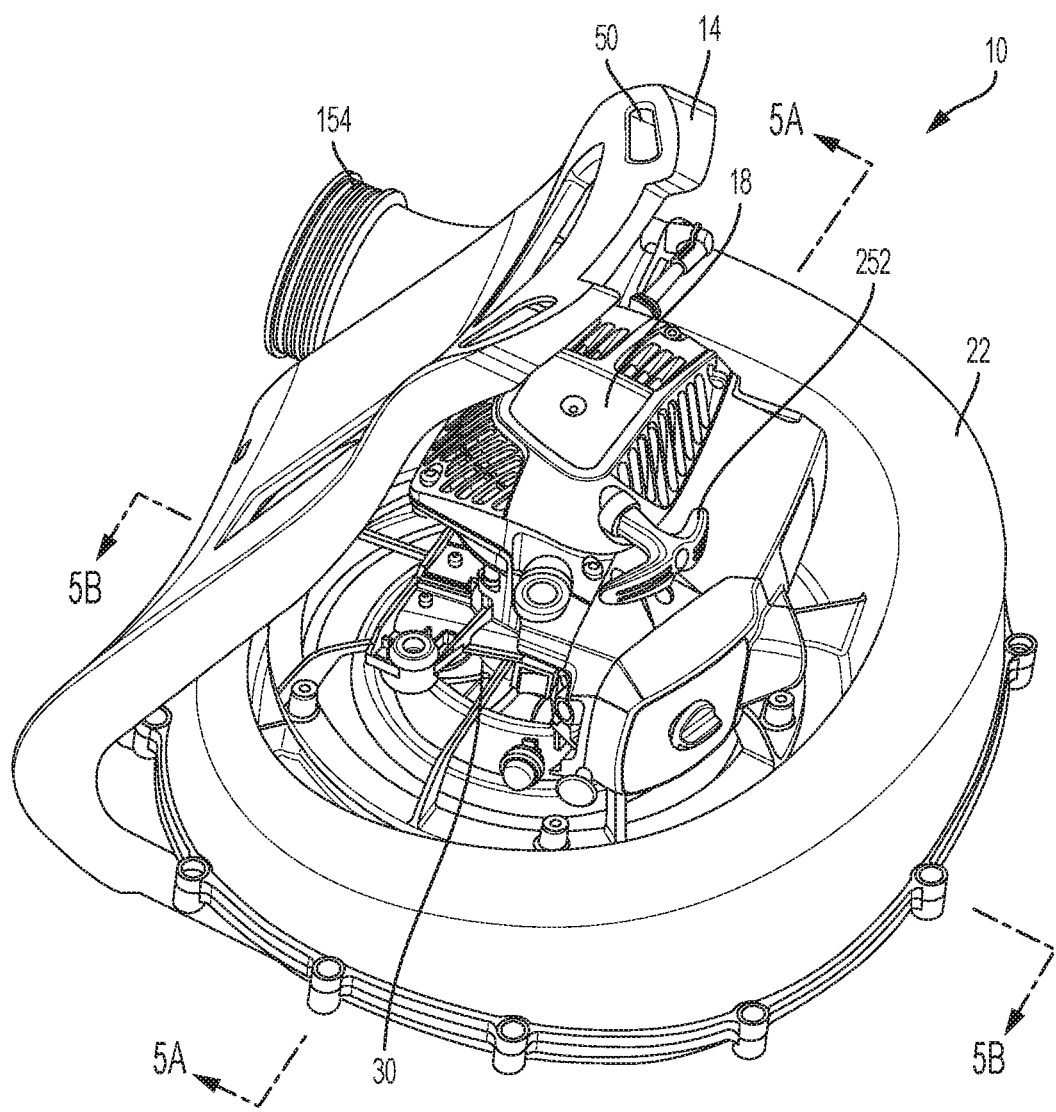
FIG. 1 is a perspective view of a backpack blower.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

FIGS. 1-5B illustrate a backpack blower 10. The blower 10 includes a frame 14, a power source, such as an engine 18, an impeller housing 22 defining a blower volume or chamber 26, and an impeller 30 at least partially positioned within the blower volume 26 and configured to rotate with respect to the impeller housing 22 about an axis of rotation 34.

The illustrated frame 14 of the blower 10 generally has an L-shape with a back plate 38 and a base portion 42 extending from the back plate 38. One or more straps (e.g., shoulder straps, a waist strap, etc. (not shown)) may be connected to the frame 14 to support and position the back plate 38 on a user's back.

Figure 2:
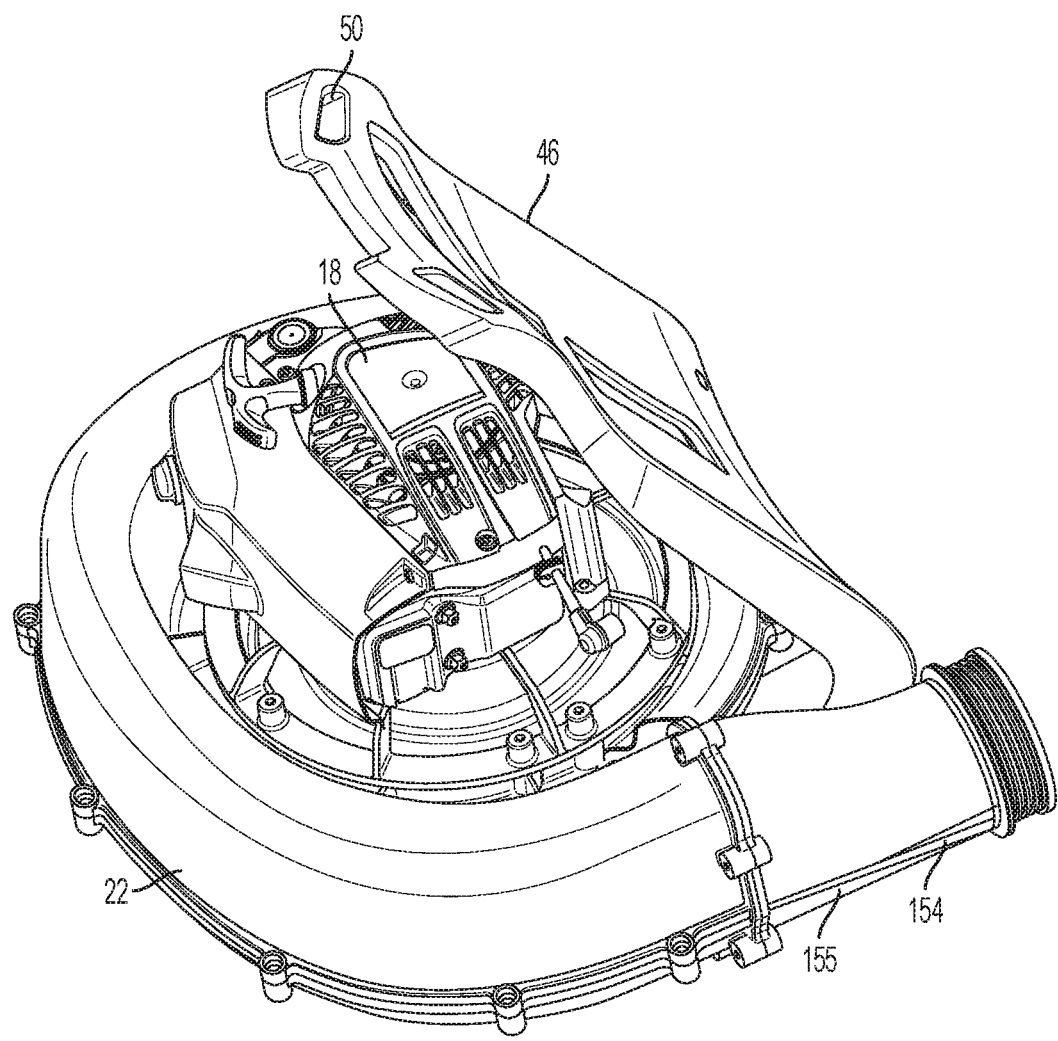
FIG. 2 is a rear perspective view of the blower of FIG. 1.
Figure 3:
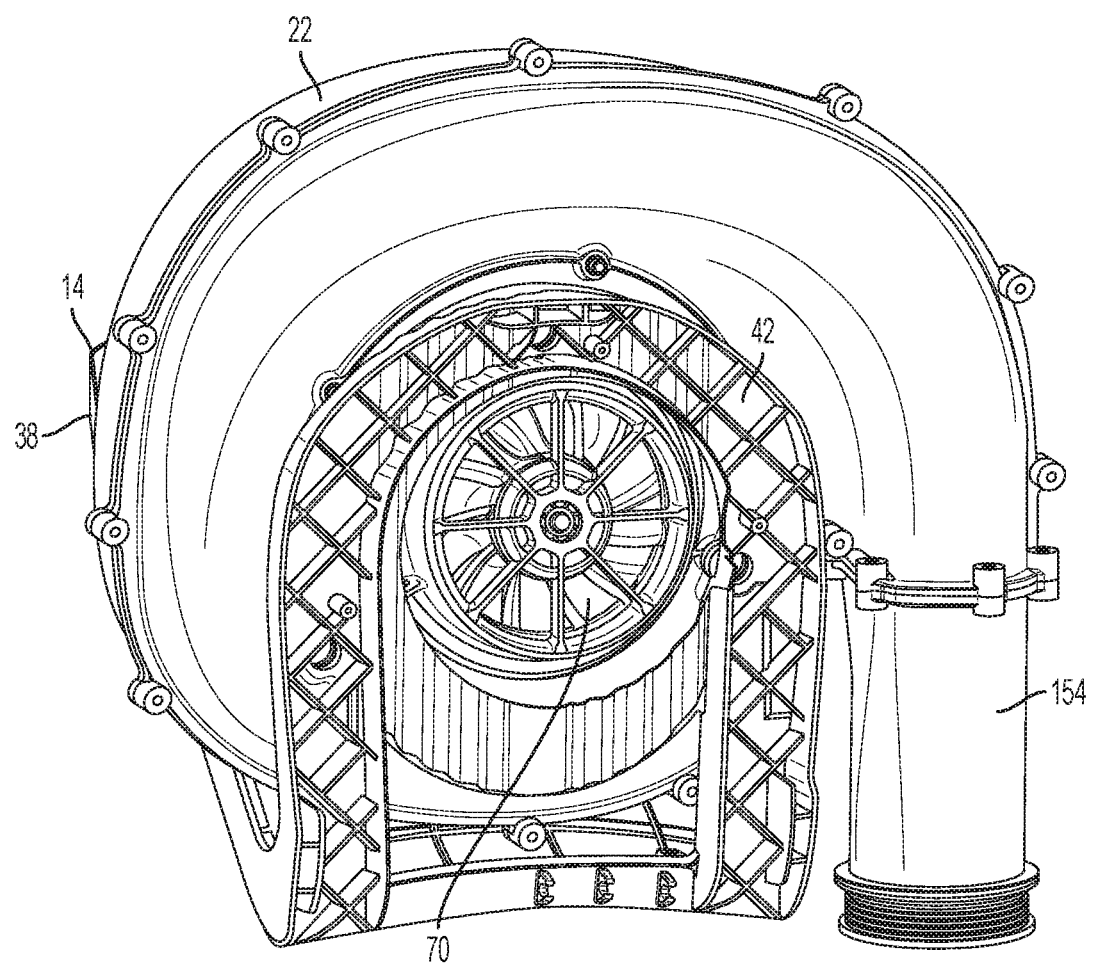
FIG. 3 is a bottom perspective view of the blower of FIG. 1.
Figure 4:
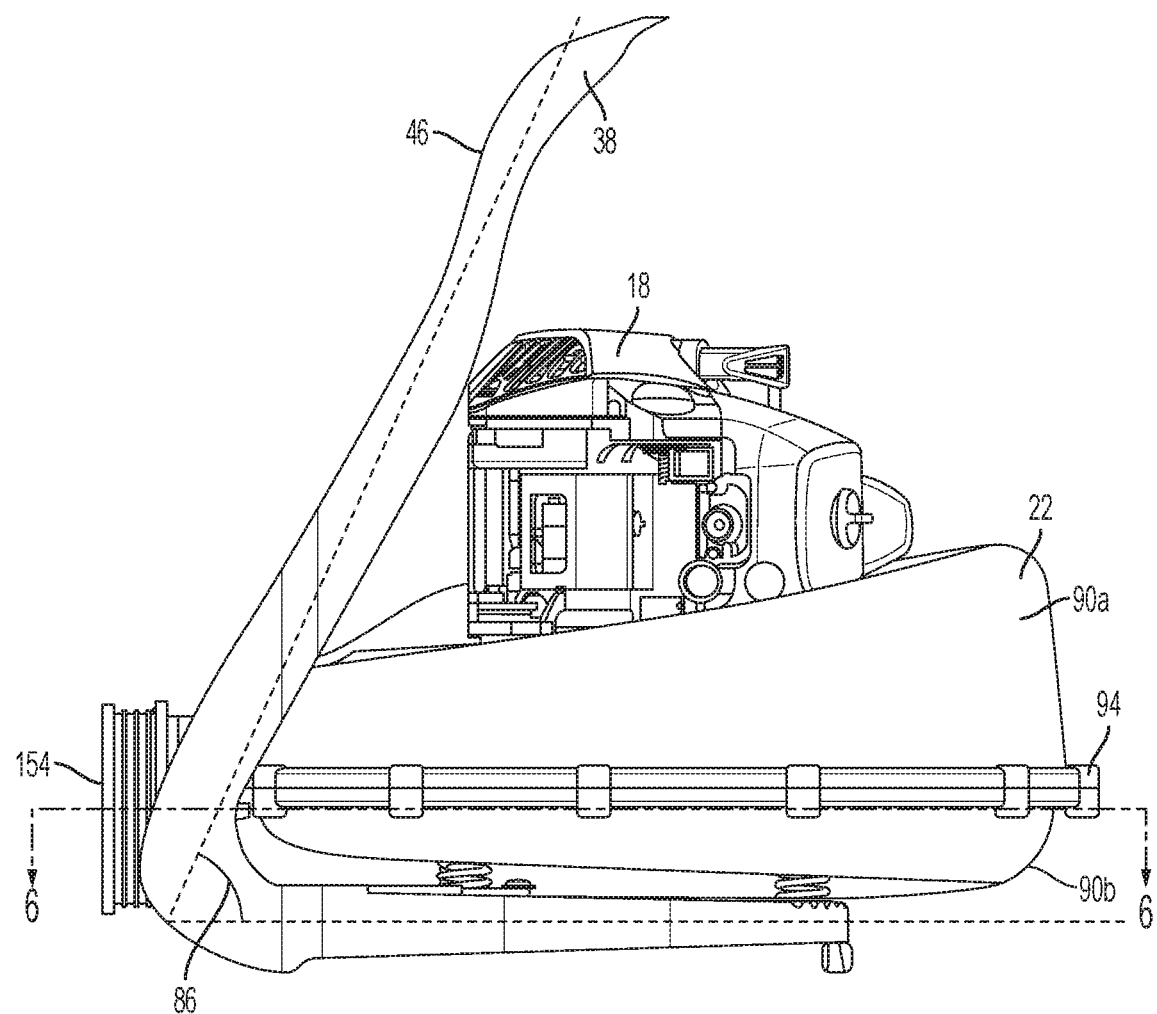
FIG. 4 is a side view of the blower of FIG. 1.

As shown in FIGS. 1-3, the back plate 38 includes a contact surface 46 and a series of apertures 50 to which the straps may be secured. In the illustrated embodiment, the contact surface 46 is substantially concave in shape being shaped to substantially correspond with the contour of the user's back. The contact surface 46 may also include (not shown) padding, fabric covering, etc. to provide improved comfort and fit.

Figure 5A:
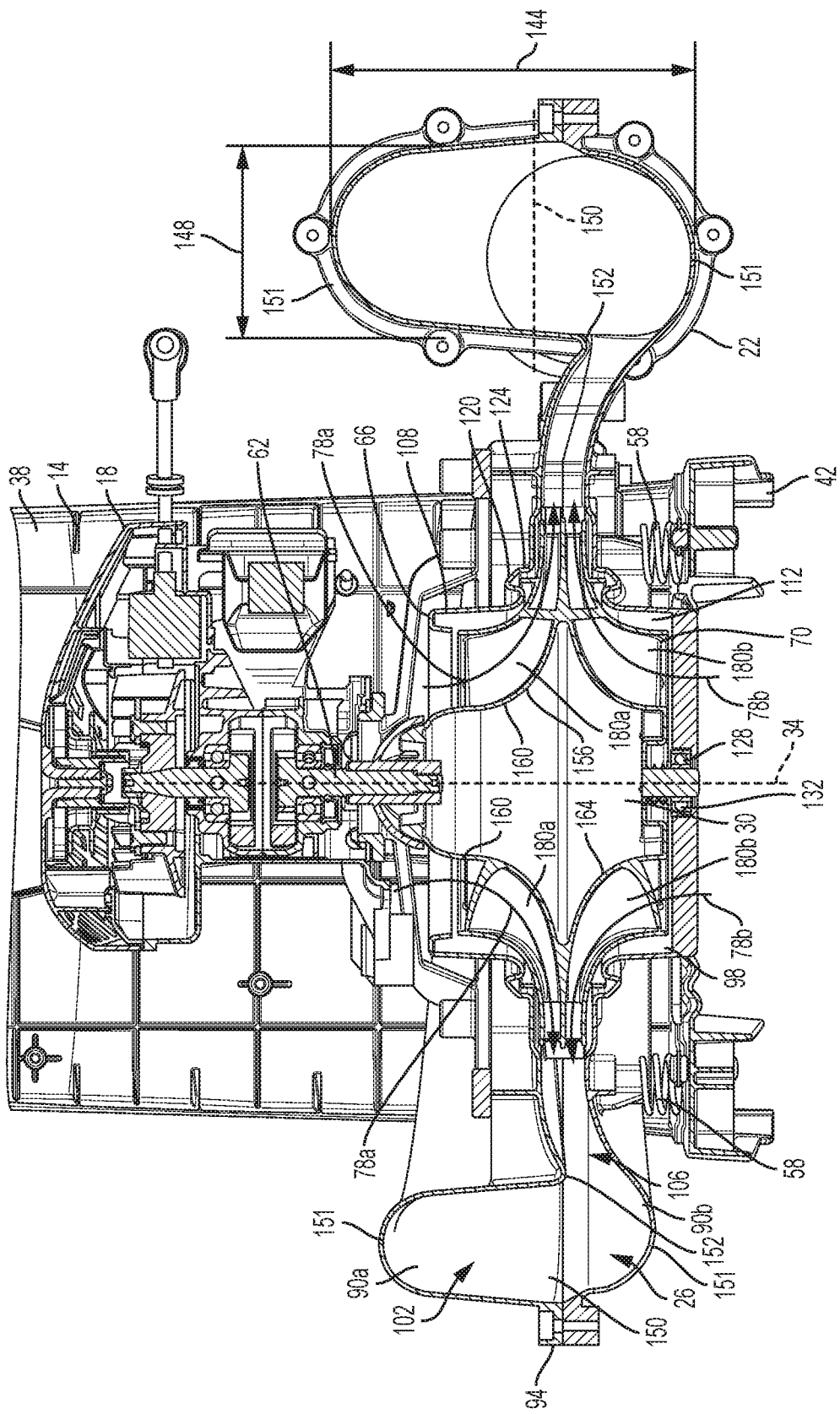
FIG. 5A is a cross-sectional view of the blower taken generally along line 5A-5A of FIG. 1.

The base portion 42 of the frame 14 is substantially U-shaped and includes one or more mounting locations or bosses 54 to which the impeller housing 22 may be mounted (see FIG. 3). As shown in FIG. 5A, the impeller housing 22 is coupled to the base portion 42 of the frame 14 with a plurality of vibration isolating elements 58, such as springs, rubber bumpers, etc.

In the illustrated construction, the engine 18 is an internal combustion engine having a rotatable output shaft 62. In other constructions, the engine 18 may include an electric motor, pneumatic motor, hydraulic motor, etc.

As described below in more detail, the impeller housing 22 is constructed to provide for air flow expansion of compressed airflow at an outlet of the impeller 30 and a smooth, non-turbulent entry into a plenum formed by the air duct. Such a shape results in a low velocity air flow in the curved section (to prevent stratification) and finally acceleration into the nozzle. The illustrated oval shape moves the center of mass of the engine 18 as close to the user as possible and reduces the size of the blower 10.

The impeller housing 22 defines a pair of inlets 66, 70 in fluid communication with the blower volume 26 and an outlet 74. In use, the impeller 30 rotates with respect to the impeller housing 22 drawing in two separate airflows 78a, 78b of ambient air via the two inlets 66, 70, respectively. The impeller 30 then accelerates and directs the airflows 78a, 78b into the blower volume 26 in which the airflows 78a, 78b are combined and expelled via the outlet 74.

The base portion 42 of the frame 14 defines a central aperture 82 substantially corresponding in size and shape to the second inlet 70 of the impeller housing 22 to allow unobstructed airflow. In the illustrated embodiment, the base portion 42 is oriented at an angle 86 with respect to the back plate 38 (see FIG. 4). By angling the base portion 42 upwardly (e.g., with the angle 86 being less than 90 degrees), the center of mass (CM) of the backpack blower 10 is positioned closer to the user for ease of use and to reduce the stress placed on the user's back. In the illustrated construction, the angle 86 is between about 30 degrees and 60 degrees (e.g., approximately 40 degrees).

As shown in FIGS. 1-6, the impeller housing 22 includes a first clamshell body 90a, coupled to a second clamshell body 90b to form the blower volume 26 therebetween. In the illustrated embodiment, the clamshell bodies 90a, 90b are generally oriented parallel to and opposite one another and are coupled along their respective perimeters 94.

The blower volume 26 of the impeller housing 22 is enclosed between the first and second clamshell bodies 90a, 90b and includes a central region 98 positioned proximate the center of the impeller housing 22, a channel region 102 extending along the perimeter 94 of the impeller housing 22 to the outlet 74, and a transition region 106 extending between and in fluid communication with both the central region 98 and the channel region 102.

Figure 5B:
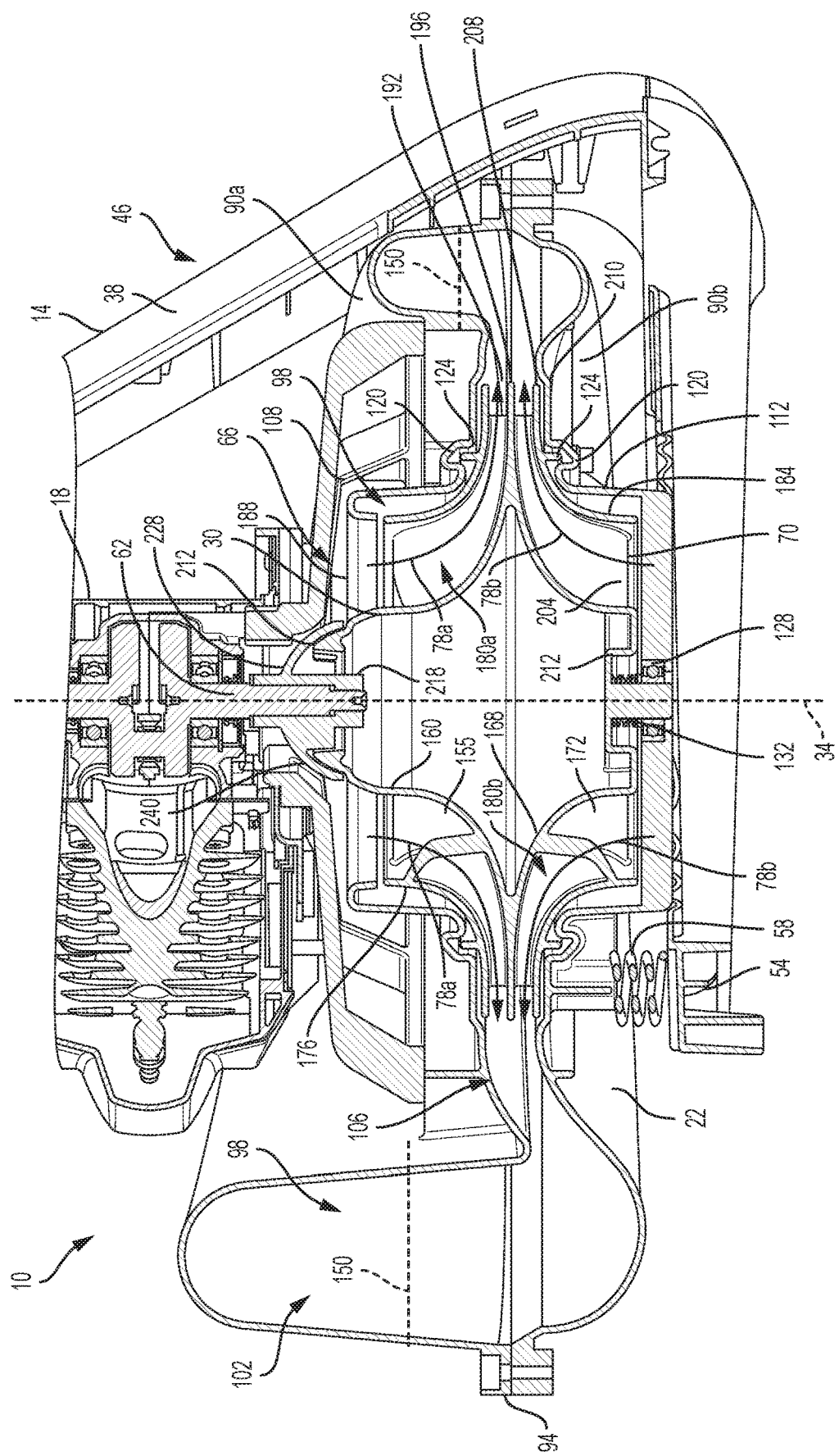
FIG. 5B is a cross-sectional view of the blower taken generally along line 5B-5B of FIG. 1.

Illustrated in FIGS. 5A-5B, the central region 98 of the volume 26 is sized and shaped to receive at least a portion of the impeller 30. The central region 98 includes the first inlet 66 defined by the first clamshell body 90a, the second inlet 70 separate from the first inlet 66 and defined by the second clamshell body 90b, and an annular opening in fluid communication with a transition region 106.

In the illustrated embodiment, the central region 98 is bounded by an upper conical wall portion 108 extending axially upwardly (e.g., toward the engine 18) and radially inwardly to define the first inlet 66 and a lower conical wall portion 112 extending axially downwardly (e.g., away from the engine 18) and radially inwardly to define the second inlet 70. Both inlets 66, 70 are substantially circular in cross-sectional shape and include a transitional fairing 116 to providing a smooth transition between the inlet 66, 70 and the impeller 30 positioned within the central region 98.

Both conical wall portions 108, 112 also include an annular groove 120 configured to receive at least a portion of a corresponding annular wall 124 of the impeller 30. Once assembled, the interaction between the wall 124 and the annular groove 120 form a tortuous path or a labyrinth seal to minimize the flow of air from the higher pressure fan outlets 192, 208, and the lower pressure fan inlets 66, 70.

The lower conical wall portion 112 also includes a bearing boss 128 proximate the second inlet 70 and axially aligned with the axis 34 of the impeller 30. The bearing boss 128 at least partially receives a portion of a bearing 132 which, in turn, supports the impeller 30 within the blower volume 26.

Figure 6:
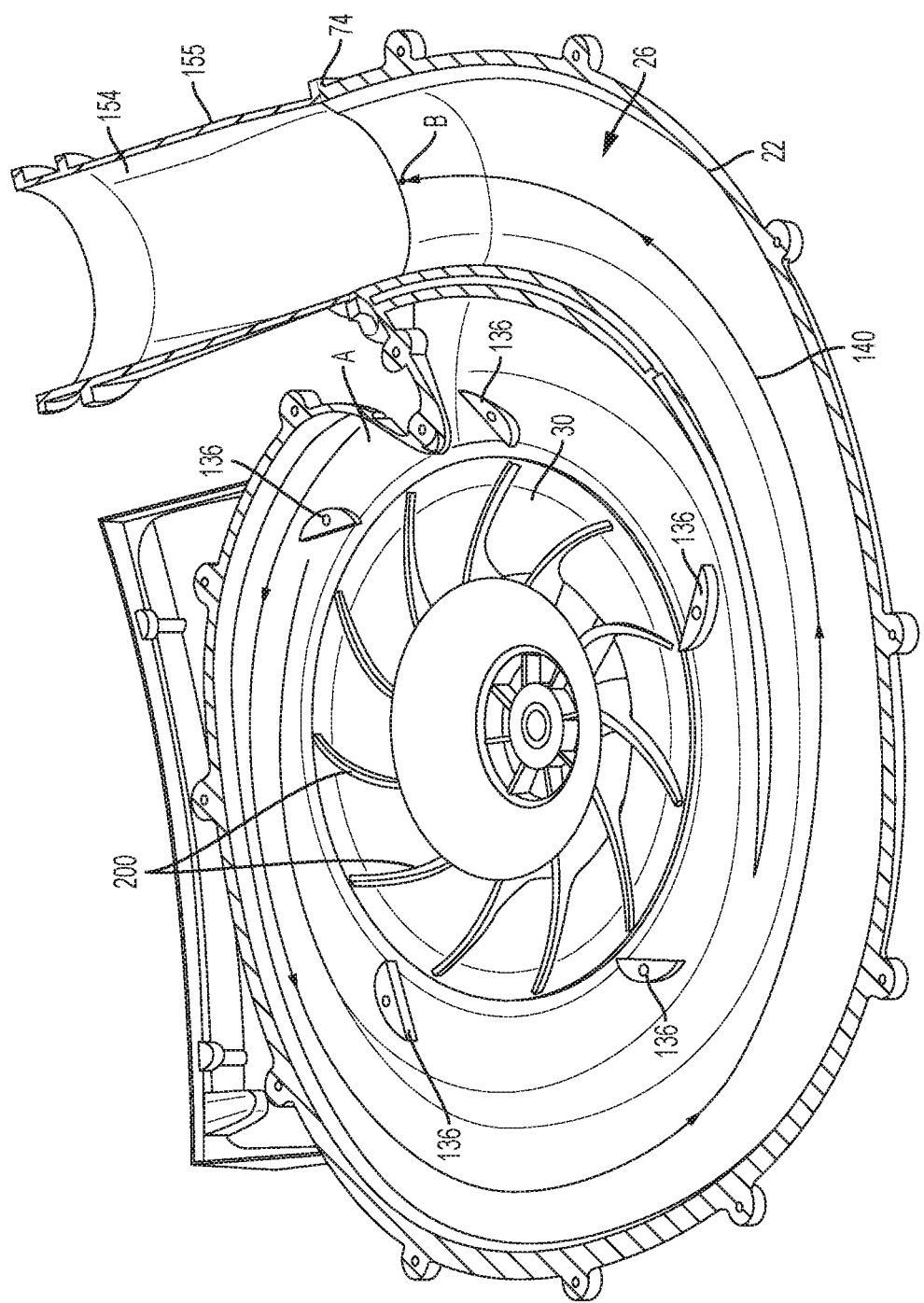
FIG. 6 is a cross-sectional view of the blower taken generally along line 6-6 of FIG. 4.
Figure 7:
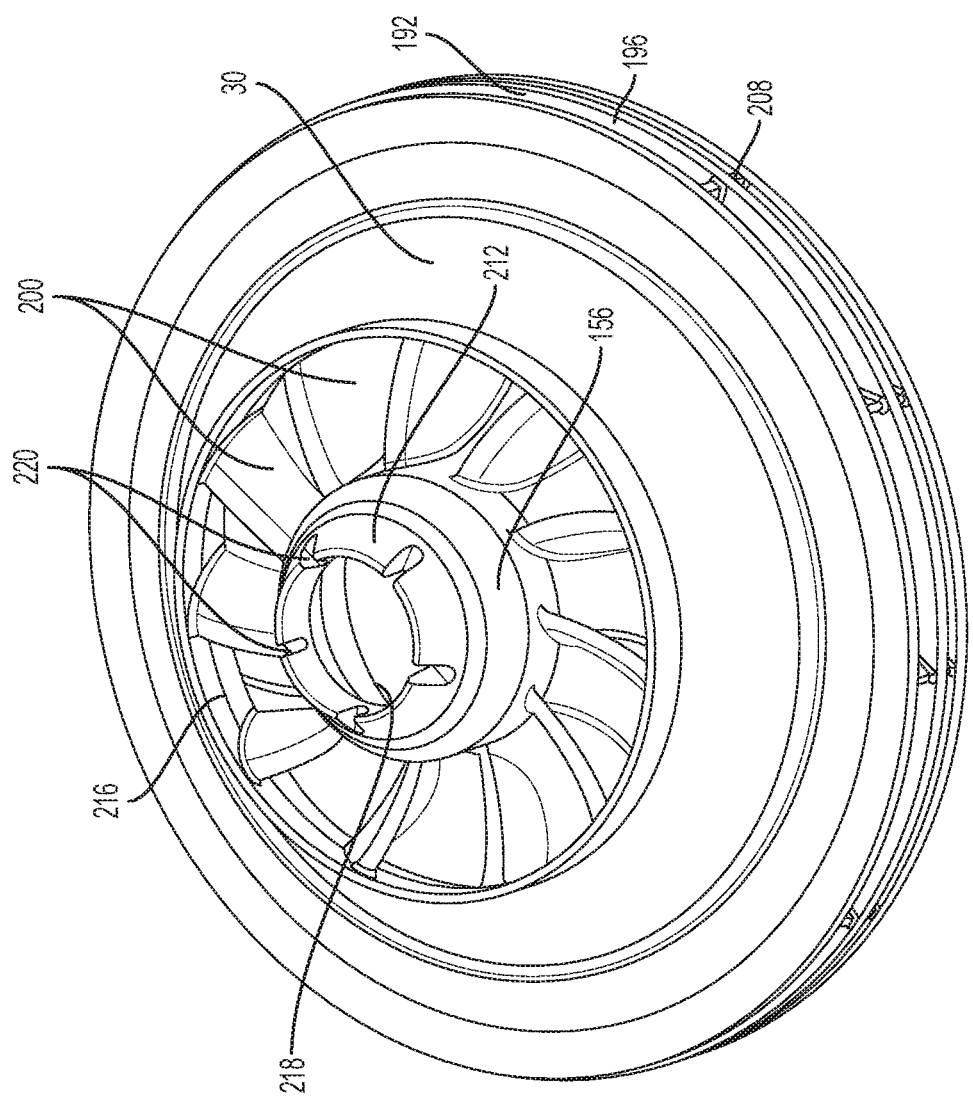
FIG. 7 is a perspective view of the impeller of the blower of FIG. 1.

As illustrated in FIGS. 5-6, the transition region 106 is positioned radially outside of the central region 98 and is configured to receive the airflows 78a, 78b from the impeller 30 and convey both airflows 78a, 78b to the channel region 102. In the illustrated embodiment, the transition region 106 is a substantially annular-shaped and maintains a substantially even axial height throughout. Furthermore, the transition region 106 slightly curves axially downwardly as it extends radially outwardly (see FIG. 5A-5B).

As illustrated, the transition region 106 includes one or more vanes 136 configured to direct the flow of air between the impeller 30 and the channel region 102. More specifically, each vane 136 extends between the clamshell bodies 90a, 90b and has an elongated airfoil-like cross-sectional shape. As shown in FIG. 6, the vanes 136 are angled in the direction of airflow (e.g., counterclockwise). In the illustrated construction, the vanes 136 provide mounting bosses for fasteners (not shown) connecting the clamshell bodies 90a, 90b and the bracket supporting the engine 18.

Illustrated in FIGS. 5-6, the channel region 102 includes an elongated channel extending along the perimeter 94 of the impeller housing 22 from a channel inlet 152 to the outlet 74. More specifically, the channel region 102 originates proximate point A and extends along an extension axis 140 in a substantially counter-clockwise pattern (in FIG. 6) before terminating proximate point B at the outlet 74. The channel region 102 extends greater than about 180 degrees and, in the illustrated embodiment, about 330 degrees to about 360 degrees (e.g., approximately 350 degrees) about the axis 34 of the impeller 30.

The cross-sectional shape of the channel region 102 in a plane perpendicular to the extension axis 140 is substantially oval in shape, with an axial height 144 greater than its transverse or radial width 148 at each point along the axis 140. The channel region 102 defines a central plane 150 extending radially through the channel region 102 at the midpoint of the height (see FIG. 5A). In the illustrated embodiment, the cross-sectional area of the channel region 102 increases from point A to point B and in the direction of airflow. Stated differently, the axial height 144 of the channel region 102 increases from a first position proximate the back plate 38 to a second position spaced a greater distance from the back plate 38 than the first position. With the illustrated construction, the channel region 102 accommodates a relatively increased volume of airflow therethrough while minimizing the distance between the axis 34 and the back plate 38 and between the axis and the radial periphery of the impeller housing 22.

The inlet 152 of the channel region 102 is formed into the sidewall and opens to the transition region 106. In the illustrated embodiment, the inlet 152 extends along substantially the entire length of the channel region 102 (e.g., from point A to point B); however, in alternative embodiments (not shown), only portions of the channel region 102 may include an inlet 152.

The inlet 152 of the channel region 102 is offset from the cross-sectional center of the corresponding channel region 102. More specifically, the entire inlet 102 does not cross the central plane 150 of the channel region 102 (e.g., the inlet 102 is positioned between the central plane 150 and one axial extent 151 of the channel region 102; see FIG. 5A). Stated differently, the chamber inlet 152 is completely positioned on one side of a midpoint of the axial height of the channel region 102. In addition, from the central region 98 and toward channel region 102, the transition region 106 moves (e.g., curves) away from the central plane 150 such that the inlet 152 of the channel region 102 is farther from the central plane 150 than the outlet of the impeller 30. As illustrated, the airflows 78a, 78b enter the channel region 102 toward one axial extent 151 of the channel region 102.

The illustrated location of the inlet 152 of the channel region 102, configuration of the transition region 106, and/or relatively larger volumetric size of the channel region 102 (when compared to the transition region 106) may provide a non-turbulent and low velocity entry of the air flow into the channel region 102 to prevent stratification.

The impeller housing 22 also includes an exhaust nozzle 154 coupled to the outlet 74 and providing a connection point for an external hose, tube, etc. The exhaust nozzle 154 includes an outer annular wall 155 that transitions from a first cross-sectional shape, corresponding to the cross-sectional shape of the outlet 74, to a second cross-sectional shape, having a smaller area than the first cross-sectional shape. The exhaust nozzle 154 thus serves to accelerate the airflow within the impeller housing 22.

Illustrated in FIGS. 5A-5B and 7-8, the illustrated impeller 30 includes a mixed flow fan assembly with a pair of mixed flow fans connected or formed as a singular component. The mixed flow fan assembly includes a dual inlet mirrored mixed flow impeller is operable to draw air into the blower duct from two opposing directions from top and bottom inlets. For example, a top fan draws air across the engine 18 and into the blower duct (thereby potentially providing cooling to the engine 18) while a bottom fan draws air from a bottom side of the blower duct. Both fans may be formed similar to a centrifugal fan to direct the air radially outwardly into the blower duct as it leaves the blades of the respective fan. Such a mixed flow fan assembly may provide an increased volumetric flow rate for a given outer diameter compared to a single impeller which would be much larger, and require a larger housing, to achieve the same flow.

The impeller 30 includes a body 156 with a first conical surface 160 terminating at a first axial end 164 and a second conical surface 168 terminating in a second axial end 172. A first outer wall 176 is spaced a distance from the first conical surface 160 to define a first airflow path 180a therebetween, and a second outer wall 184 is spaced a distance from the second conical surface 168 to define a second airflow path 180b therebetween. As mentioned above, rotation of the impeller 30 about the axis 34 draws separate airflows 78a, 78b into respective airflow paths 180a, 180b. Both airflows 78a, 78b are then accelerated by the impeller 30 and exhausted in radially outwardly into the transition region 106 of the blower volume 26.

Figure 8:
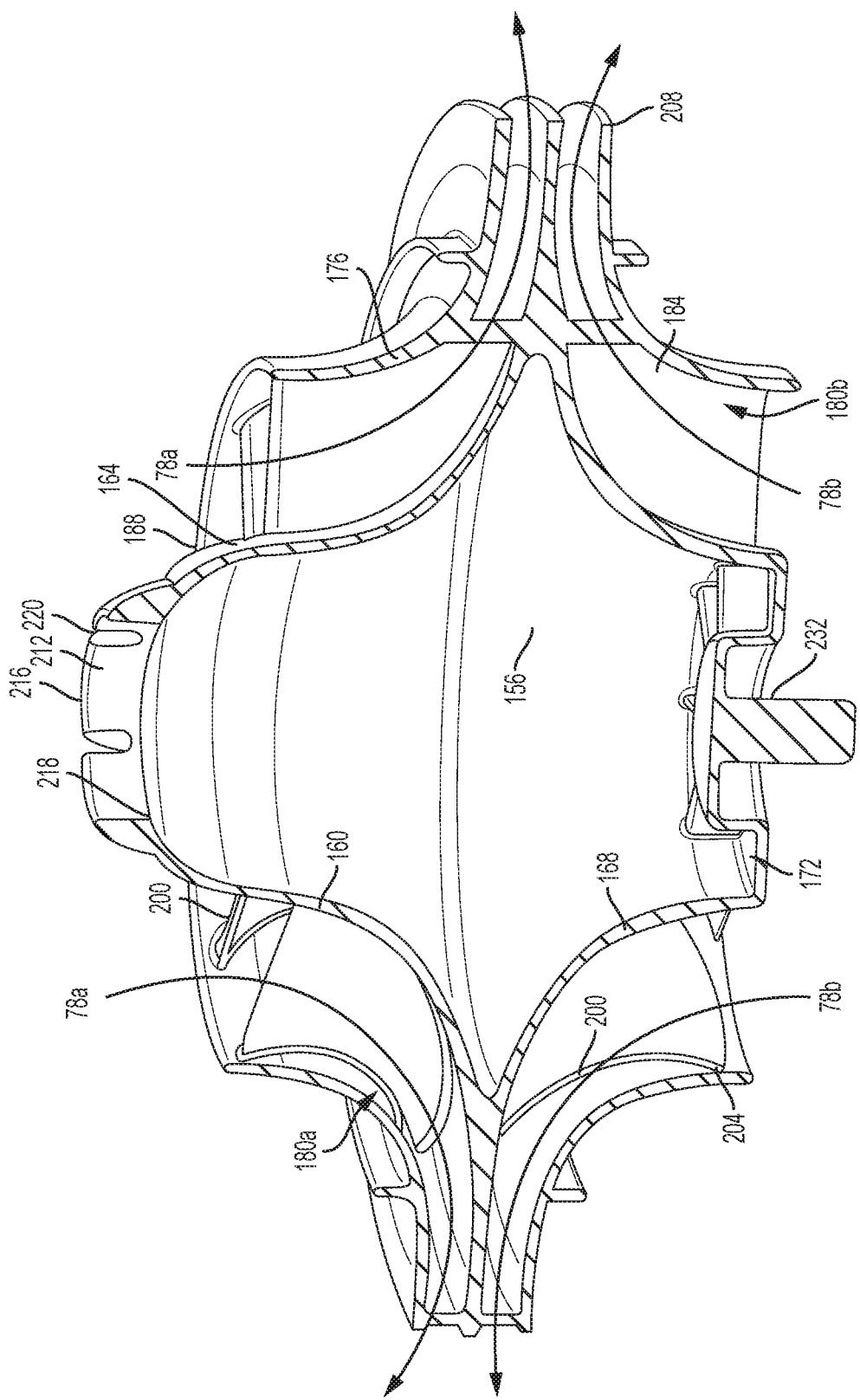
FIG. 8 is a cross-sectional view of the impeller taken generally along line 8-8 of FIG. 7.
Figure 9:
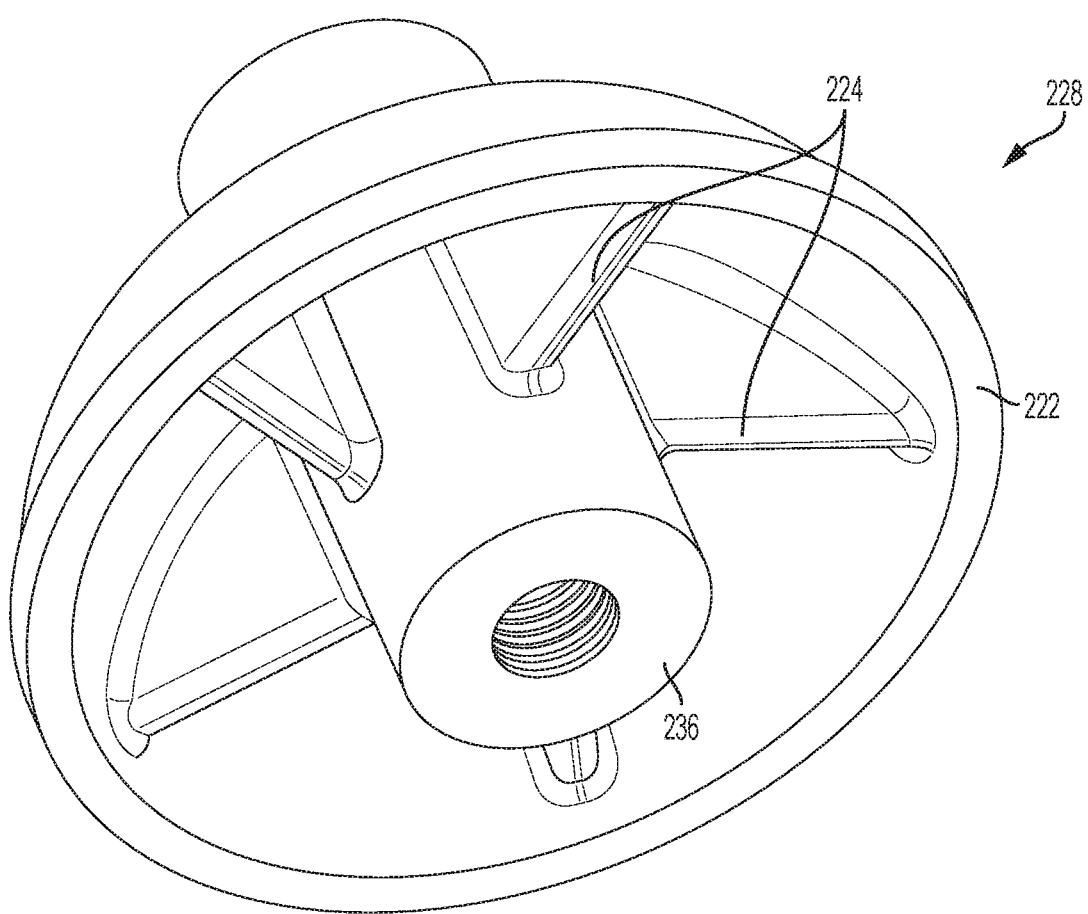
FIG. 9 is a perspective view of a coupler of the blower of FIG. 1.

The first airflow path 180a is substantially annular in shape having a first inlet 188 open in an axial direction proximate the first axial end 164 and a first outlet 192 extending along the periphery 196 in a substantially radial direction (see FIG. 8). The first airflow path 180a is shaped to smoothly transition the airflow 78a from a substantially axial direction (e.g., into the first inlet 188) to a substantially radial direction (e.g., out of the first outlet 192). The first airflow path 180a is also enclosed by the body 156 of the impeller 30 along its entire length between the first inlet 188 and the first outlet 192.

The first airflow path 180a also includes a plurality of vanes 200 positioned within the airflow path 180a and extending between the first conical surface 160 and the first outer wall 176. The vanes 200 are configured to accelerate the first airflow 78a as it passes through the first airflow path 180a. In the illustrated embodiment, the vanes 200 are swept in a direction opposite the direction of rotation of the impeller 30.

The second airflow path 180b is also substantially annular in shape having a second inlet 204 open in a substantially axial direction proximate the second axial end 172 and a second outlet 208 extending along the periphery 196 in a substantially radial direction (see FIG. 8). The second airflow path 180b is shaped to smoothly transition the second airflow 78b from a substantially axial direction (e.g., into the second inlet 204) to a substantially radial direction (e.g., out of the second outlet 208). The second airflow path 180b is also enclosed by the body 156 of the impeller 30 along its entire length between the second inlet 204 and the second outlet 208.

The second airflow path 180b also includes a plurality of vanes 200 positioned within the airflow path 180b and extending between the second conical surface 168 and the second outer wall 184. The vanes 200 are configured to accelerate the second airflow 78b as it passes through the second airflow path 180b. In the illustrated embodiment, the vanes 200 are swept in a direction opposite the direction of rotation of the impeller 30.

Proximate each outlet 192, 208, each conical wall portion 108, 112 defines a recess 210 receiving the associated outer wall 176, 184 of the impeller 30. With this arrangement, the inner surface of each outer wall 176, 184 is substantially flush with the adjacent surface of the conical wall portion 108, 112 to provide a smooth surface for the airflows 78a, 78b into the transition region 106. Likewise, the surface of each inlet 66, 70 is substantially flush with the inner surface of the adjacent outer wall 176, 184 for entry of the airflows 78a, 78b. In the illustrated embodiment, the outlets 192, 208 of the impeller 30 are positioned axially closer to the midpoint of the axial height of the channel region 102 than the chamber inlet 152 (with the upper outlet 192 being closest to the midpoint).

The impeller 30 also defines a coupling portion 212 proximate the first axial end 164 and including an annular ridge 216 formed by the body 156 to define an aperture 218. In the illustrated embodiment, the annular ridge 216 includes a substantially hemispherical outer contour (see FIG. 7). The ridge 216 also defines a plurality of radially oriented grooves 220 spaced (e.g., equally) about the circumference.

The impeller 30 also defines a support boss 232 aligned with the axis 34 and positioned proximate the second axial end 172. The support boss 232 is configured to receive at least a portion of the bearing 132 positioned in the bearing boss 128. The support boss 232 and the bearing boss 128 cooperate to position the impeller 30 within the central region of the impeller housing 22.

Illustrated in FIGS. 5A-5B and 9-10, the blower 10 also includes a coupler 228 coupled to and extending between the output shaft 62 of the engine 18 and the coupling portion 212 of the impeller 30. The coupler 228 is configured transmit torque between the shaft 62 and the impeller 30 so that the two elements to rotate together as a unit. The coupler 228 is also configured to allow some movement/misalignment between the output shaft 62 and the impeller 30. In the illustrated embodiment, the coupler 228 and the bearing boss 128 define the location of the impeller 30 within the impeller housing 22. The illustrated coupling arrangement may allow for a modular assembly the engine 18 may be separated from the impeller housing 22.

The coupler 228 includes a central hub 236, a semi-spherical hood 240 extending radially outwardly from the hub 236, and a plurality of ribs 244 extending between the hub 236 and the hood 240. The shape of the annular ridge 216 substantially corresponds to the inner shape of the hood 240. The grooves 220 on the coupling portion 218 and ribs 244 are sized, spaced and oriented to facilitate engagement.

The output shaft 62 of the engine 18 is rotatably coupled to a threaded aperture defined by the hub 236. The coupler 228 is connected to the coupling portion 212 of the impeller 30. The coupling portion 212 is at least partially inserted into the space formed between the hood 240 and the hub 236 such that the hub 236 is at least partially positioned within the aperture 218 of the ridge 216 and each rib 244 is at least partially received within a corresponding one of the grooves 220. As shown in FIGS. 5A-5B, the outer surface of the hood 240 merges into the outer surface of the impeller 30. Once assembled, the coupling portion 212 engages with and interlocks with the coupler 228 allowing the coupler 228 and impeller 30 to rotate as a unit.

Figure 10:
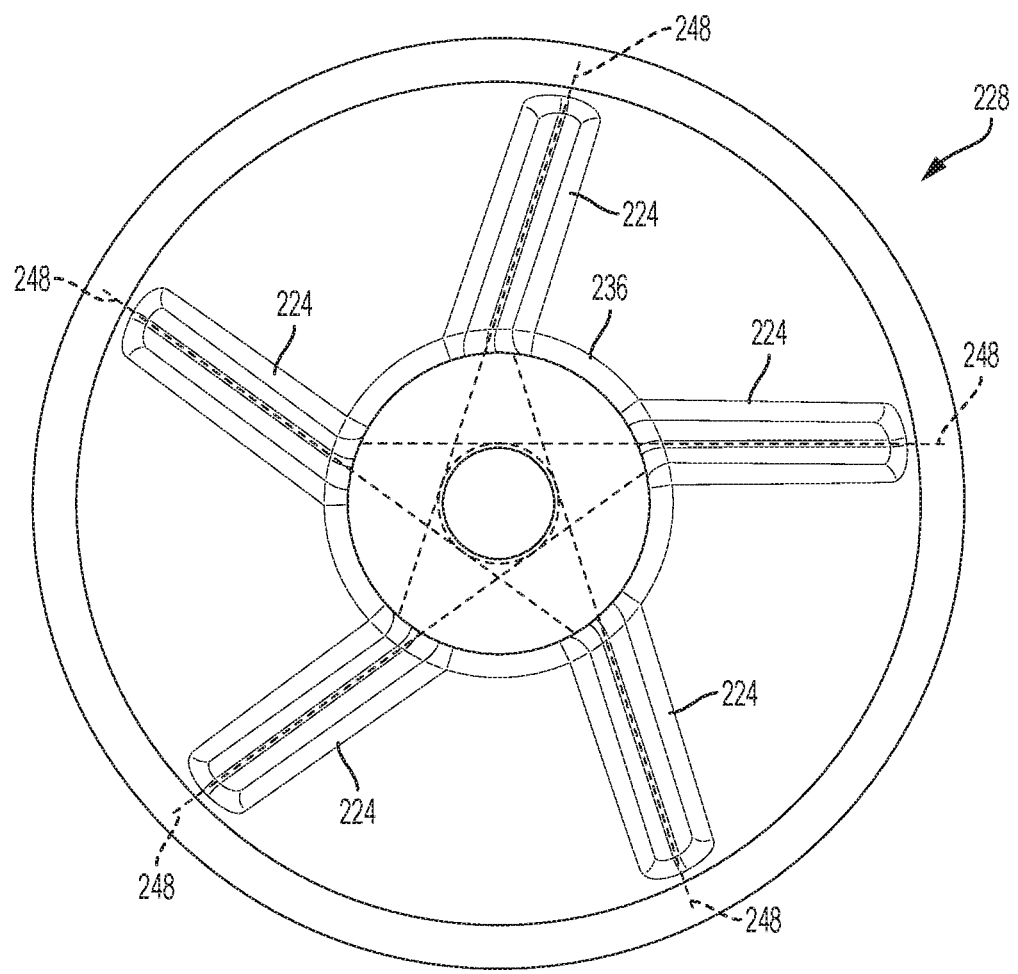
FIG. 10 is a bottom view of the coupler of FIG. 9.

As best illustrated in FIG. 10, the ribs 244 of the coupler 228 are positioned such that an axis 248 of each rib 244 does not pass through the axis 34 (e.g., is non-radial). Rather, each rib 244 and each rib axis 248 is offset from a radial orientation. As illustrated, each rib 244 and each axis 248 extends generally tangentially to a circle about the axis 34. The illustrated configuration of the coupler 228 may improve connection between the output shaft 62 and the impeller 30 and reduce noise produced during operation.

While the coupler 228 is shown being attached to the drive shaft 62 with the ribs 244 engaging the impeller 30, it should be understood that, in alternative embodiments (not shown), the coupler 228 may be attached to the impeller 30 with the ribs 244 engaging the drive shaft 62.

To operate the blower 10, the user starts the engine 18, and the engine 18 rotates the output shaft 62 which, in turn, causes the coupler 228 to rotate. The coupler 228 then transmits the torque of the engine 18 to the impeller 30 via the engagement between the ribs 244 and the grooves 220. As such, the impeller 30 and the output shaft 62 rotate together as a unit about the axis 34.

Rotation of the impeller 30 draws in separate airflows 78a, 78b into the impeller housing 22. The first airflow 78a is drawn into the first inlet 188 of the impeller 30 via the first inlet 66 of the impeller housing 22. The first airflow 78a is then accelerated by the vanes 200 in the first airflow path 180a and exhausted radially through the first outlet 192 and into the transition region 106.

Simultaneously, the second airflow 78b is drawn into the second inlet 204 of the impeller 30 via the second inlet 70 of the impeller housing 22. The second airflow 78b is then accelerated by the vanes 200 in the second airflow path 180b and exhausted radially through the second outlet 208 and into the transition region 106.

After exiting the impeller 30, the two airflows 78a, 78b merge into a single airflow traveling radially outwardly over substantially the entire circumferential length of the impeller 30. The combined airflow then continues to travel radially outwardly through the transition region 106 where it enters the channel region 102 of the blower volume 26.

In the channel region 102, the combined airflow originates proximate point A and travels in a counter clockwise-direction (in FIG. 6) along the channel region 102 and toward the outlet 74. As the airflow travels along the channel region 102, additional air is added to channel region 102 via the inlet 152 along the entire length of the channel region 102. As such, the volume of air increases as it travels along the length of the channel region 102 and is accommodated by the increasing cross-sectional area of the channel region 102. After the combined airflow reaches the outlet 74, the combined airflow enters the exhaust nozzle 154 which, as described above, tapers (e.g., the cross-sectional area decreases) and accelerates the combined airflow before it exits the blower 10.

Figure 11:
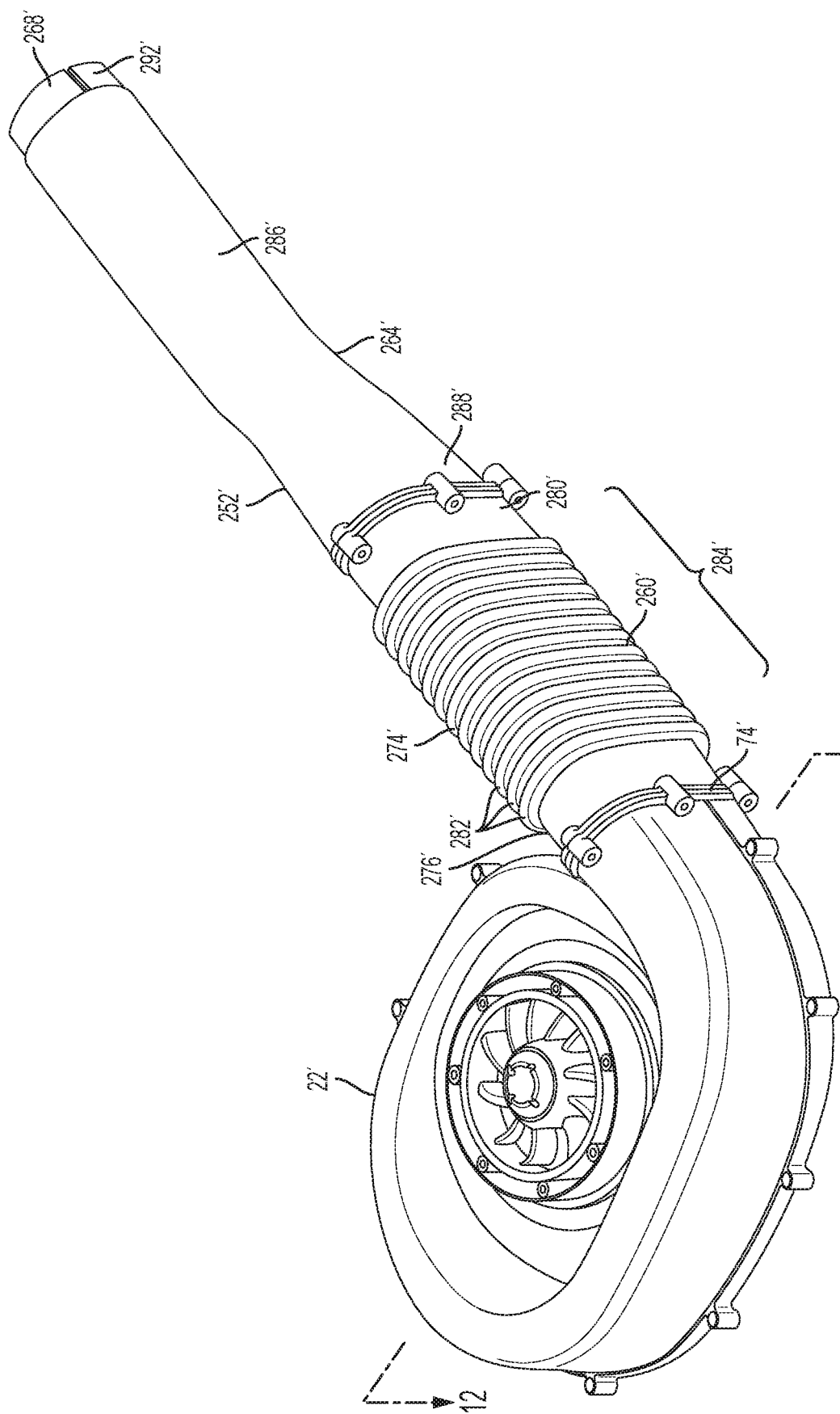
FIG. 11 is a perspective view of the impeller housing with an exhaust tube coupled thereto.
Figure 12:
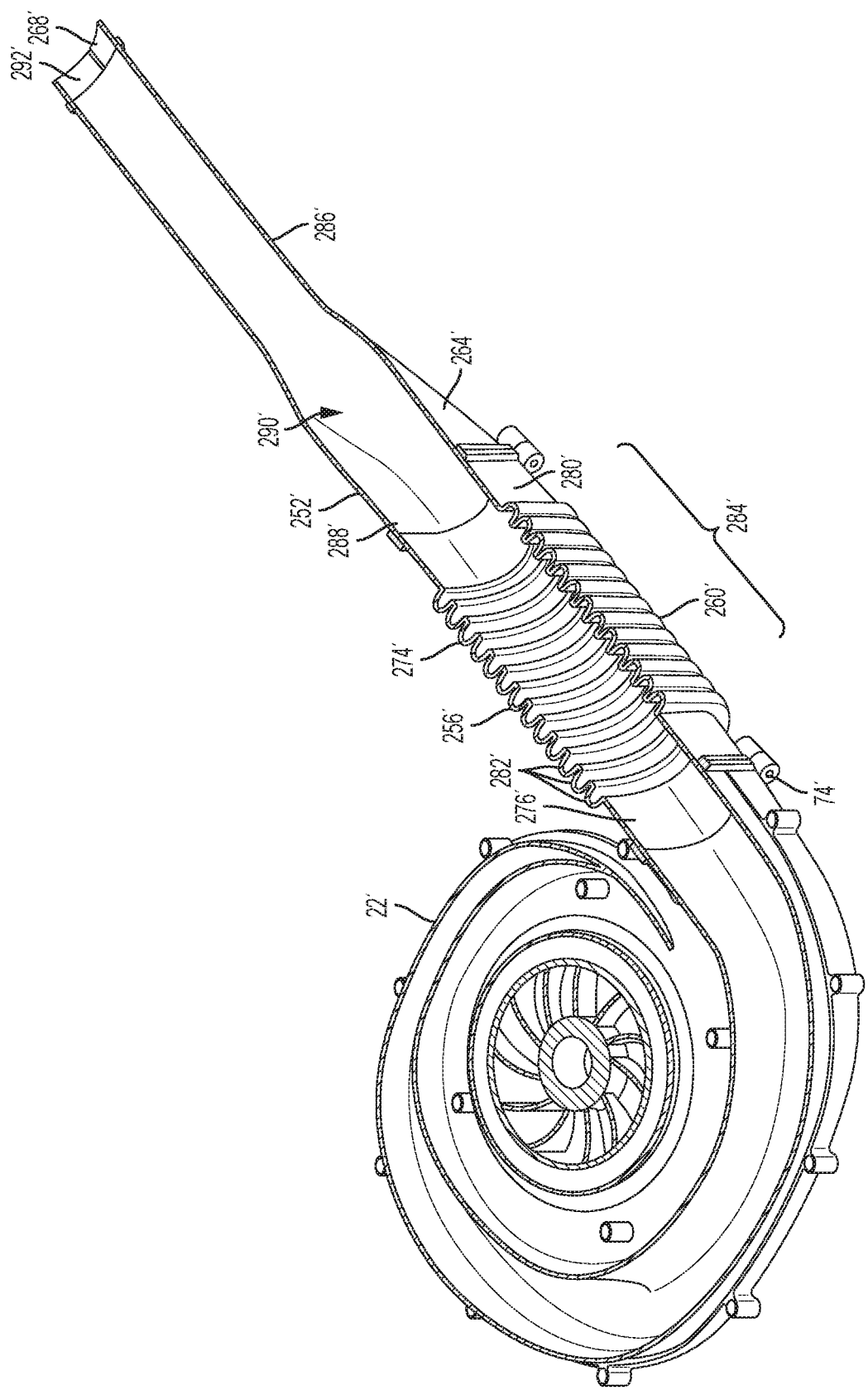
FIG. 12 is a section view taken along line 12-12 of FIG. 11.
Figure 13:
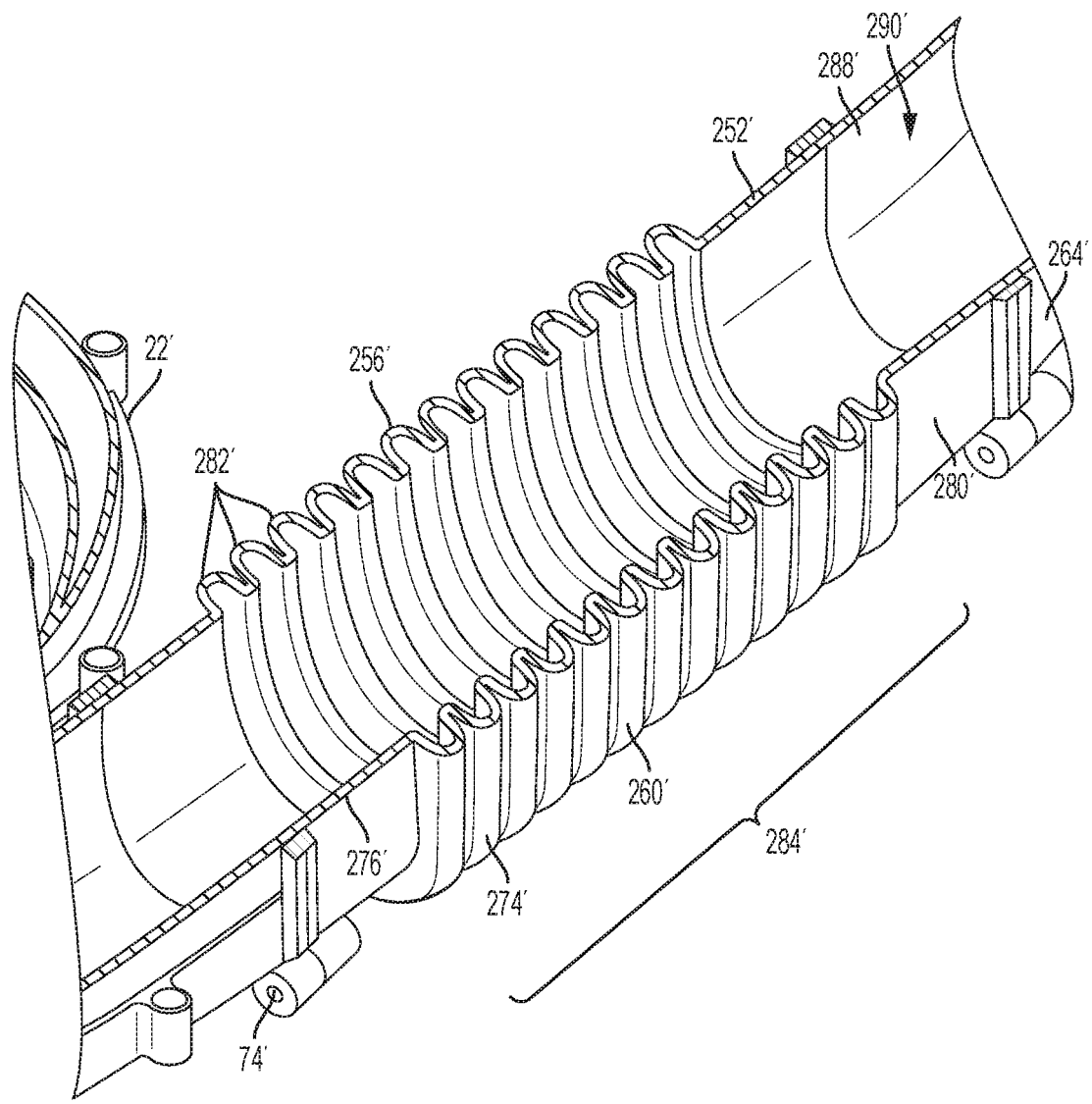
FIG. 13 is a detailed view of the exhaust tube of FIG. 12.

FIGS. 11-13 illustrate another embodiment of the impeller housing 22'. The impeller housing 22' is substantially similar to the impeller housing 22, as described above, and only differences will be described herein.

The impeller housing 22' includes an exhaust duct or tube 252' coupled to the outlet 74' and configured to convey the combined airflow therethrough. The exhaust duct 252' includes a bellows or flexible portion 260' coupled to the outlet 74' and a rigid portion 264' coupled to and extending from the flexible portion 260' to an exhaust port 268'. During use, the combined airflow enters the flexible portion 260' of the exhaust duct 252' via the outlet 74', flows through the flexible and rigid portions 260', 264', and is exhausted through the exhaust port 268'.

As illustrated in FIG. 13, the flexible portion 260' of the exhaust duct 252' is substantially elongated in shape being formed from an outer wall 274' having a first end 276', an opposite second end 280', and at least partially defining a channel 256' therethrough. During use, the first end 276' of the flexible portion 260' is movable relative to the second end 280' while generally maintaining the cross-sectional shape and the integrity of the channel 256' thus assuring that air entering the first end 276' is directed and passes through the second end 280'.

The outer wall 274' of the flexible portion 260' is generally formed from a resilient and flexible material, such as rubber, etc. The outer wall 274' has a serpentine shape and includes a flexible region or bellows portion 284' with a plurality of ribs 282' to permit the outer wall 274' to expand, contract, and elastically deform.

In the illustrated implementation, the smallest cross-sectional area formed by the flexible region 284' of the outer wall 274' is at least as large as the cross-sectional area of the first end 276' of the flexible portion 260'. As such, the flexible region 284' does not restrict the flow of air therethrough. Proximate its inlet, the flexible region 284' has a non-circular cross-sectional shape. In particular, the inlet of the flexible region 284' is substantially oval in shape.

Furthermore, the flexible portion 260' and the smallest cross-sectional area of the flexible region 284' have a cross-sectional shape substantially similar to the cross-sectional shape of the outlet 74' of the impeller housing 22', that is, having a height that is greater than its width. By having a cross-sectional shape that is similar to that of the outlet 74', the flexible portion 260' reduces pressure head loss during operation.

The rigid portion 264' of the exhaust duct 252' is substantially tubular in shape having a body 286' with a first end 288' and an opposite second end 292' forming the exhaust port 268'. The body 286' of the rigid portion 264' also defines a second channel 290' extending therethrough and open to the exhaust port 268'. The first end 288' of the rigid portion 264' is coupled to the second end 280' of the flexible portion 260' causing the second channel 290' to be in fluid communication with the first channel 256'.

In the illustrated embodiment, the body 286' of the rigid portion 264' transitions in cross-sectional shape from the first end 288' to the second end 292'. The first end 288' has a cross-sectional shape substantially similar to the cross-sectional shape of the second end 280' of the flexible portion 260' (e.g., non-circular or oval) and, likewise, to the cross-sectional shape of the outlet 74' of the impeller housing 22'. The second end 292' of the rigid portion 264' is substantially circular in cross-sectional shape and has a cross-sectional area less than the cross-sectional area of the first end 288'. As such, the rigid portion 264' of the exhaust duct 252' accelerates the airflow as it passes therethrough.

Although the invention has been described in detail with reference to certain preferred constructions, variations and modifications exist within the scope and spirit of one or more independent aspects of the invention as described.

One or more independent features and/or independent advantages of the invention may be set forth in the claims.

What is claimed is:

1. A blower comprising:

a housing at least partially defining a chamber;

an impeller driven about a rotational axis to generate an air flow within the chamber, the impeller having a first axial end, a second axial end opposite the first axial end, and a periphery, the impeller defining a first airflow path having a first axial inlet proximate the first axial end and open in a first axial direction and a first radial outlet extending about the periphery and open in a substantially radial direction, the impeller defining a second airflow path separate from the first airflow path, the second airflow path having a second axial inlet proximate a second axial end and open in an opposite, second axial direction and a second radial outlet extending along the periphery of the impeller in a substantially radial direction, wherein the impeller includes a body having a first conical surface terminating at the first axial end and a second conical surface terminating at the second axial end, and wherein the first conical surface and the second conical surface share a common wall; and wherein the chamber of the housing at least partially defines a channel region extending circumferentially about at least a portion of the impeller, and wherein the channel region includes a chamber inlet open to and in fluid communication with the first radial outlet and the second radial outlet of the impeller; and wherein the channel region has an axial height measured parallel to the rotational axis, and wherein the chamber inlet is positioned completely on one side of a midpoint of the axial height of the channel region.

2. The blower of claim 1, wherein the body includes a first outer wall spaced from the first conical surface to at least partially define the first airflow path therebetween and a second outer wall spaced from the second conical surface to at least partially define the second airflow path therebetween.

3. The blower of claim 2, wherein each of the first airflow path and the second airflow path include a plurality of vanes connected between the respective conical surface and the respective outer wall.

4. The blower of claim 1, wherein each of the first airflow path and the second airflow path is configured to transition a corresponding airflow from a substantially axial direction to a substantially radial direction.

5. The blower of claim 1, wherein the housing defines a first opening communicating with the first axial inlet and a second opening communicating with the second axial inlet.

6. The blower of claim 1, wherein each of the first radial outlet and the second radial outlet is axially closer to the midpoint of the axial height of the channel region than the chamber inlet.

7. The blower of claim 2, wherein the both the first outer wall and the second outer wall are substantially conical in shape.

* * * * *